(12) United States Patent  (10) Patent No.: US 6,681,047 B1
Saito  (45) Date of Patent: Jan. 20, 2004

(54) METHOD AND SYSTEM FOR DETERMINING CHARACTER EDGES BASED UPON EDGES PAIR AND IMAGE CHARACTERISTICS OF PIXELS BETWEEN THE EDGE PAIR

(75) Inventor: Takashi Saito, Kanagawa (JP)

(73) Assignee: Ricoh Co., Ltd., Tokyo (JP)

( * ) Notice: Subject to any disclaimer, the term of this patent is extended or adjusted under 35 U.S.C. 154(b) by 571 days.

(21) Appl. No.: 09/583,603

(22) Filed: May 31, 2000

(30) Foreign Application Priority Data

May 31, 1999 (JP) ............................. 11-151566

(51) Int. Cl.[7] ................................ G06K 9/48
(52) U.S. Cl. ................. 382/199; 382/177; 382/266
(58) Field of Search ....................... 382/112, 174, 382/176, 177, 181, 190, 195, 199, 200, 219, 266, 269, 270; 358/2.1

(56) References Cited

U.S. PATENT DOCUMENTS 5,745,596 A * 4/1998 Jefferson .................... 382/176
5,793,936 A * 8/1998 Deffner et al. ............... 358/1.9
6,064,494 A * 5/2000 Hirota et al. ................ 358/1.9
6,366,699 B1 * 4/2002 Kuwano et al. ............. 382/199

FOREIGN PATENT DOCUMENTS

| JP | 3-64251 | 3/1991 | .......... H04N/2/387 |
| JP | 5-145749 | 6/1993 | .......... H04N/2/40 |
| JP | 6-150059 | 5/1994 | .......... G06K/9/20 |
| JP | 7-95397 | 4/1995 | .......... H04N/2/40 |

OTHER PUBLICATIONS

Chang, et al "Line sweep thinning algorithm for feature analysis", IEEE, pp. 123–127, 1997.*

* cited by examiner

*Primary Examiner*—Daniel G. Mariam
(74) *Attorney, Agent, or Firm*—Knoble & Yoshida, LLC

(57) ABSTRACT

The current edge pair determination system and method determine whether or not an edge pair and certain image characteristics of pixels between the edge pair as a whole or a unit is a part of a character based upon a change in pixel values. The change is compared to a predetermined set of conditions that are exclusionary in nature. Since the edge pair as well the image characteristics of pixels between the edge pair are considered, the accuracy in the character edge determination has improved.

28 Claims, 6 Drawing Sheets

PIXEL IN QUESTION

PIXEL IN QUESTION

METHOD AND SYSTEM FOR DETERMINING CHARACTER EDGES BASED UPON EDGES PAIR AND IMAGE CHARACTERISTICS OF PIXELS BETWEEN THE EDGE PAIR

FIELD OF THE INVENTION

The current invention is generally related to detecting a character based upon character edges, and more particularly related to a method and a system for determining character edges based upon certain predetermined conditions of edge pairs as units.

BACKGROUND OF THE INVENTION

In order to detect edges in text or characters, certain image characteristics are utilized. For example, the certain image characteristics include a local change in intensity as well as the continuous intensity level in the image. Another exemplary image characteristics is the symmetry in intensity change. Based upon these and other image characteristics, prior attempts have disclosed various method in discriminating character edges.

Hei 3-64251 discloses a system that detects a local edge and further processes the local edge by eliminating a false character edge based upon the screen dots detection. The screen dots is defined to be a symetrical non-character edge. Although some screen dots are eliminated, since only local edges are considered for determining character edges, some false character edges are erroneously included.

Hei 6-150059 discloses a system that correctly discriminates chekered patterns and dense-line area as characters based upon a combination of a predetermined edge pattern detection, a net pattern detection, and a line orientation pattern detection. Unfortunately, since this prior attempt requires a predetermined set of fixed patterns to detect character edges, the character edge recognition is limited by the available fixed patterns.

Hei 7-95397 discloses a system for correcting the between-edge signal based upon the size or the thickness of an input character. To select character edges, the edges are detected based upon pattern matching to eliminate "screen dots." The improved process includes that the logical AND process based upon the selected character candidate areas marked by character edges and an on/off signal. The image resolution is generally degraded in the middle portion of a thick-lined character between its edges due to a simple binarization. Although there is some improvement on the binarization results, when the on/off signal is near a threshold value, the logical AND gate undesirably outputs a mixture of on and off outputs.

Hei 5-145749 discloses a system for improving the binarization process by performing simple binarization from an onset of detecting a starting-edge beyond a first predetermined threshold to another onset of detecting an ending-edge below a second predetermined threshold. Although this improved process prevents the degraded middle portion of a thick lined character between its edges, since the improved process relies upon the detection of the starting-edges and the starting edges include both character as well as non-character edges, the accuracy remains to be desired.

In view of the above described prior attempts, it is desired that edges are detected only for characters based upon certain predetermined conditions that are applicable to most characters.

SUMMARY OF THE INVENTION

In order to solve the above and other problems, according to a first aspect of the current invention, a method of detecting character edges, includes inputting image data; detecting a first edge point in the image data; detecting a second edge point which corresponds to the first edge point, the first edge point and the second edge point defining an edge pair; detecting a change in pixel value within the edge pair; and determining whether or not the edge pair as a unit is a character portion based upon the change in the pixel value between the edge pair with respect to a predetermined set of conditions for defining the character portions.

According to a second aspect of the current invention, a system for detecting character edges, including: an image input unit for inputting image data; an edge detection unit connected to the image unit for detecting a first edge point in the image data, the edge detection unit also detecting a second edge point which corresponds to the first edge point, the first edge point and the second edge point defining an edge pair; and an edge pair evaluation unit connected to the edge detection unit for detecting a change in pixel value within the edge pair, the edge pair evaluation unit determining whether or not the edge pair as a unit is a character portion based upon the change in the pixel value between the edge pair with respect to a predetermined set of conditions for defining the character portions.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
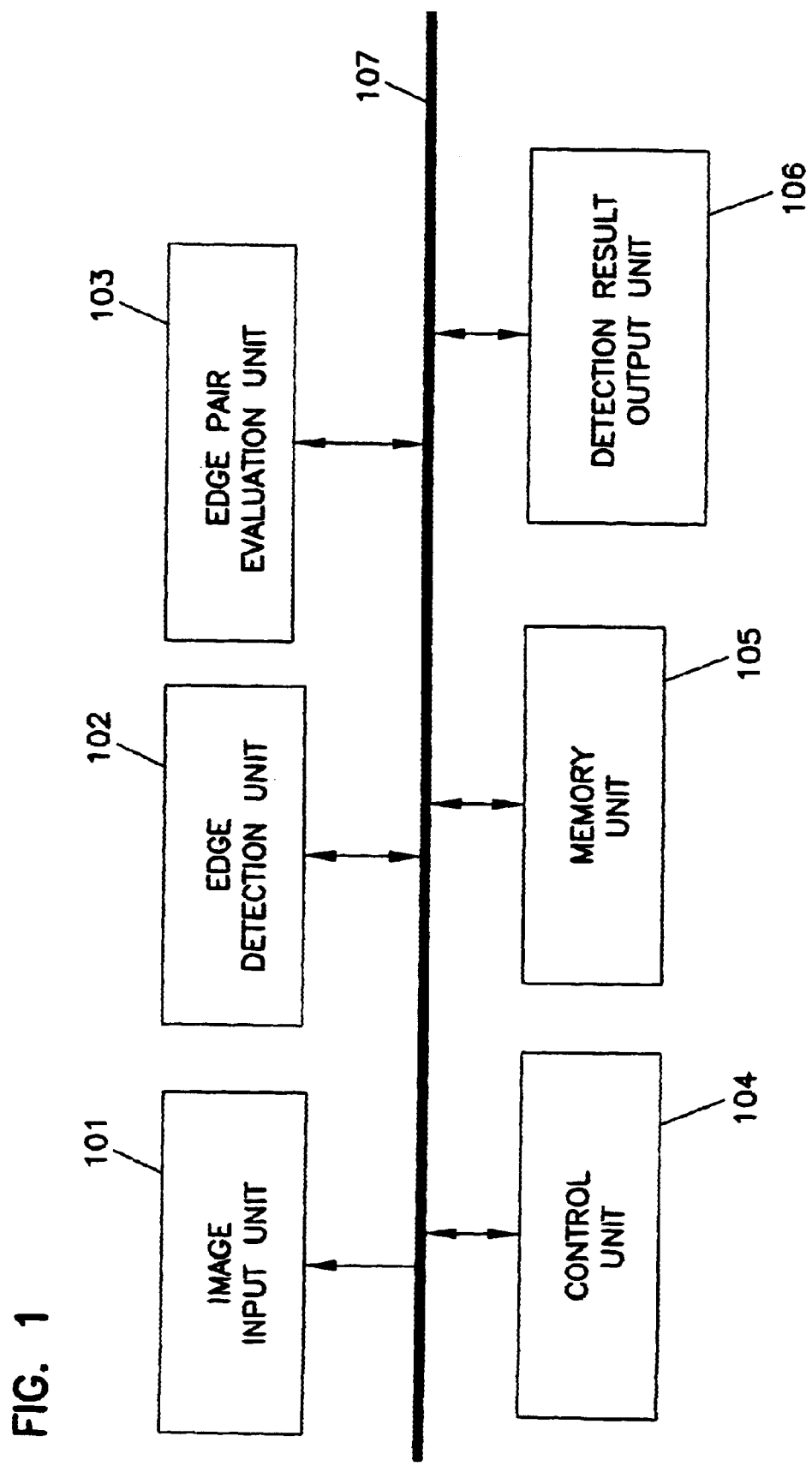
FIG. 1 is a diagram illustrating one preferred embodiment of the character edge pair detection system according to the current invention.

Referring now to the drawings, wherein like reference numerals designate corresponding structures throughout the views, and referring in particular to FIG. 1, one preferred embodiment of the character edge pair detection system according to the current invention includes an image input unit 101, an edge detection unit 102, an edge pair evaluation unit 103, a control unit 104, a memory unit 105, a detection result output unit 106 and a data communication line 107 connecting each of the above units 101–106. The image input unit 101 inputs image data into the character edge detection system, and the edge detection unit 102 detects a starting edge as well as a corresponding ending edge while the detection is repeatedly performed in a predetermined scanning direction such as in the horizontal running direction. When the a pair of edges are detected based upon a predetermined set of criteria, the edge pair evaluation unit 103 determines whether or not the detected edge pair and the pixel values between the edge pair as a unit or a whole is a character edge pair. In other words, the image characteristics between a pair of the detected edges is considered in view of a predetermined set of conditions to decide whether or not the edge pair belongs to a character. The results are stored in the memory unit 105. The stored results are also used to further determine whether or not a current edge pair in question is a part of a character. Finally, the detection result output unit 106 outputs the evaluation results on the detected edge pairs. The control unit 104 orchestrates the above described processes performed by the units.

Figure 2:
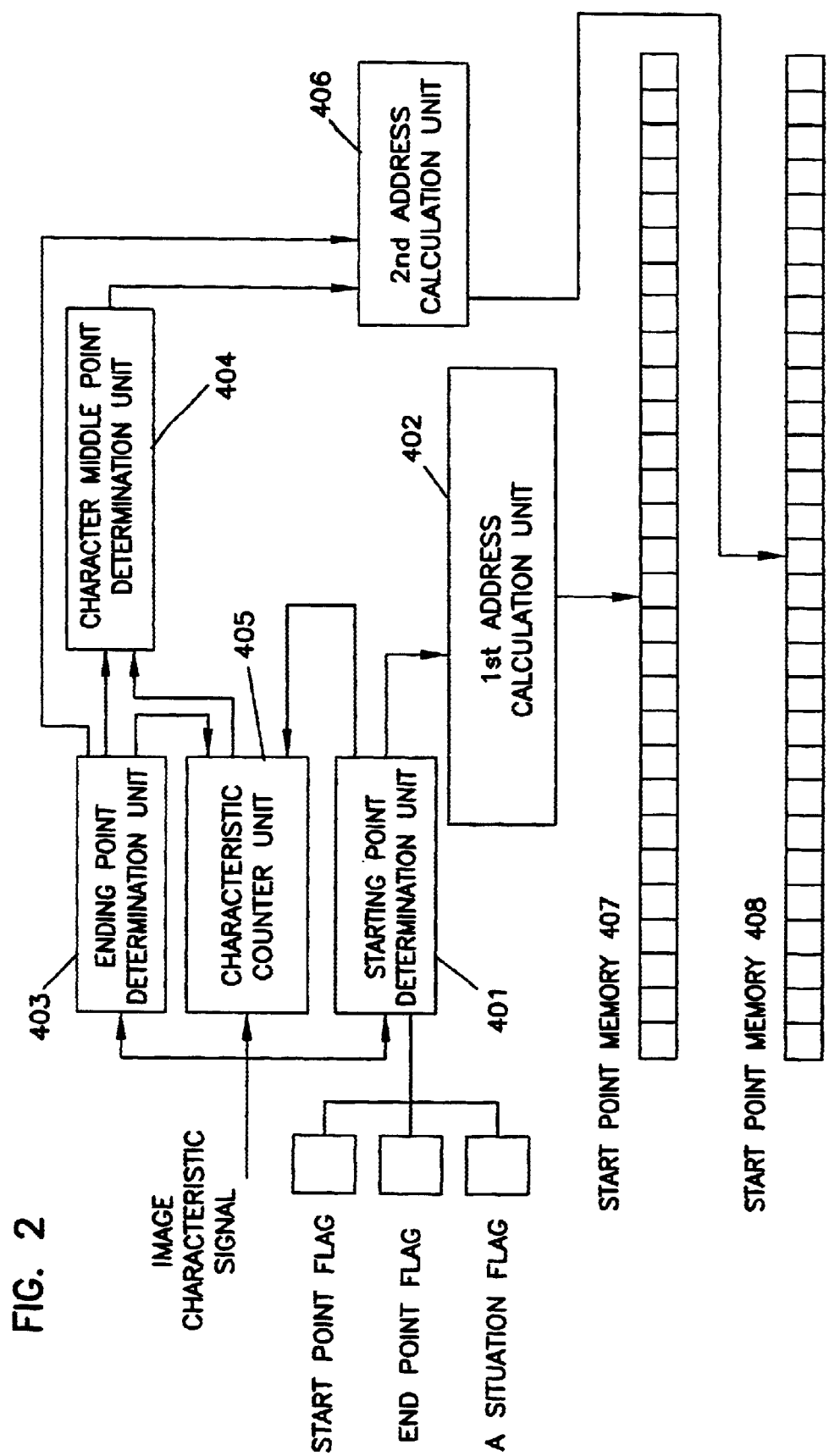
FIG. 2 is a diagram illustrating a part of a second preferred embodiment of the character edge detection system according to the current invention.

FIG. 2 is a diagram illustrating a part of a second preferred embodiment of the character edge pair detection system according to the current invention. An image characteristic signal is inputted into a starting point determination unit 401, an ending point determination unit 403 as well as a characteristic counter unit 405. After the starting point determination unit 401 and the ending point determination unit 403 determine the respective edge point, these units 401, 403 output the results to the characteristic counter unit 405. Some exemplary conditions for determining a start edge point will be described below with respect to FIGS. 4 and 5. Upon finding a start edge point, the starting point determination unit 401 resets the characteristic counter unit 405 and activates a start point flag and a situation flag. The starting point determination unit 401 also outputs the result to a first address calculation unit 402 to calculate a starting address so that the first address calculation unit 402 writes a value of the beginning address in a start point memory 407. Although one of the two pairs of values, 0 and 1 or 2 and 3 is ultimately assigned at the beginning address, either 0 or 1 is assigned to a position corresponding to a pixel in question at this point.

Still referring to FIG. 2, the ending point determination unit 403 and the characteristic counter unit 405 also output the result to a second address calculation unit 406 to calculate an ending address so that the second calculation unit 406 writes a value of the ending address in an end point memory 408. To determine an end edge point, the following conditions have to be met for the second preferred embodiment according to the current invention. The situation flag has been activated, and a character edge exists in the vicinity of the pixel in question for an end edge point. As will be described with respect to FIGS. 4 and 5, the left side of the pixel in question has a higher intensity value or substantially dark while the right side has a low intensity value or substantially white. Furthermore, the left side does not have a "screen dots," and this last condition is not absolutely necessary. Similarly, either 1 or 2 is assigned at a position corresponding to the pixel in question. The start point memory unit 407 and the end point memory 408 are both sequential memory of the width corresponding to that of each scanning line. When the above described conditions are not met, the image characteristics of the current pixel in question is stored in the characteristic counter unit 405. An end point flag is also deactivated or set to zero.

Figure 3:
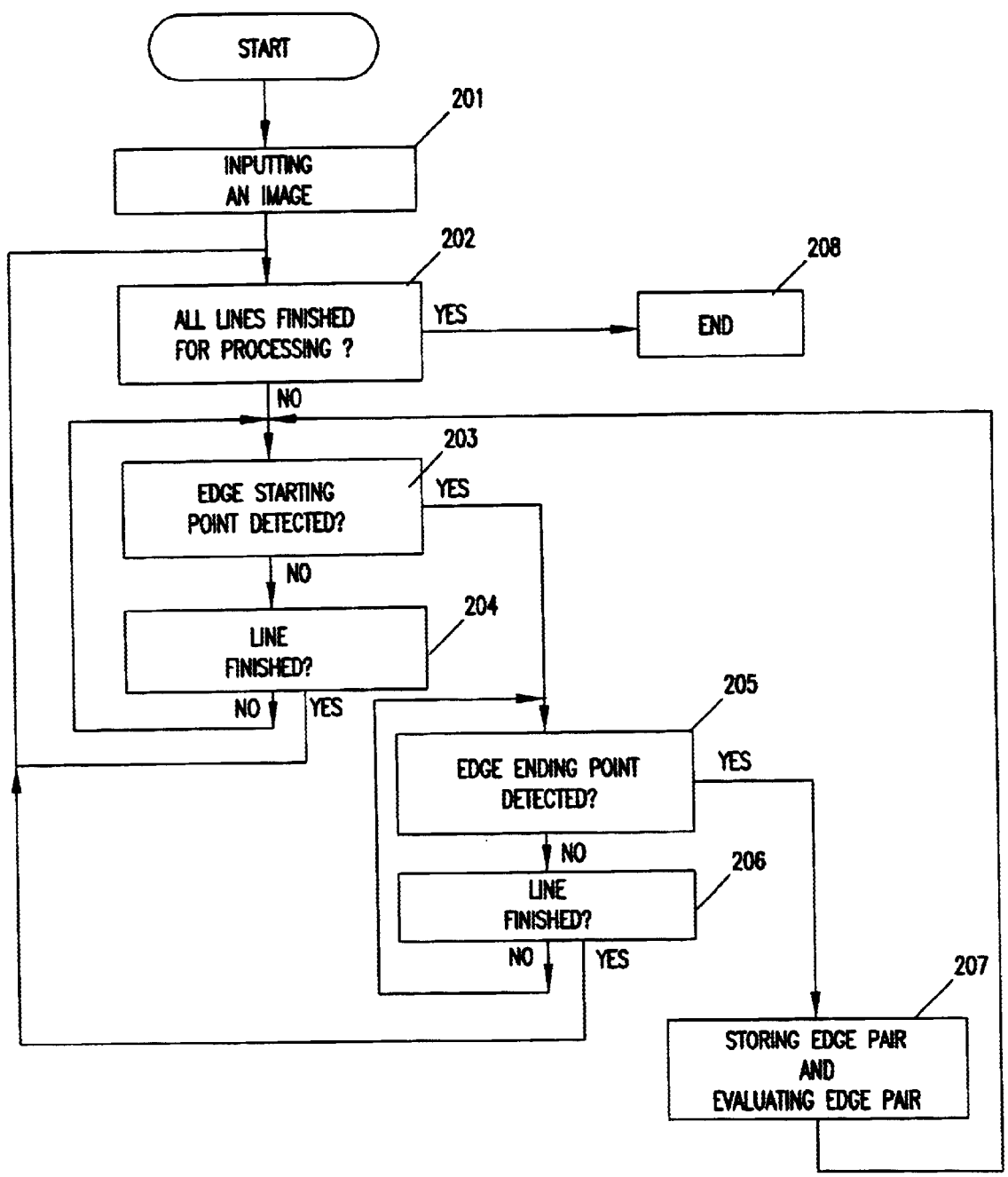
FIG. 3 is a flow chart illustrating steps or acts involved in one preferred process of determining character edges according to the current invention.

Now referring to FIG. 3, a flow chart illustrates steps or acts involved in one preferred process of determining character edges according to the current invention. In step 201, an image signal indicative of multiple bit data is inputted. It is determined whether or not every line in the inputted image is processed in step 202. If every line has been already processed, the preferred process terminates in step 208. On the other hand, there are remaining unprocessed lines in the input image, step 203 determines whether or not a start point edge is detected in each of the unprocessed lines. If no start edge is detected in the step 203, this start edge detection is repeated until an end of the scanning line, via step 204 by returning to the step 203. When the end of the line is detected in the step 204, the preferred process returns to the step 202. To perform the above described scanning and detecting steps, the edge detection unit 102 scans each of the input line from left at the beginning to right towards the end in the first preferred embodiment as shown in FIG. 1. Alternatively, the starting point determination unit 401 and the ending point determination unit 403 of the second preferred embodiment as shown in FIG. 2 perform the equivalent processes.

Still referring to FIG. 3, upon finding a start edge point in the step 203, the preferred process now attempts to find an end edge point in step 205. If no end edge is detected in the step 206, this end edge detection is repeated until an end of the scanning line by returning to the step 205. When the end of the line is detected in the step 206, the preferred process returns all the way to the step 202. Upon finding a corresponding end edge to complete an edge pair, the edge pair is evaluated in step 207. After the evaluation in the step 207, the result is stored, and the preferred process returns to the step 203.

Figure 4:
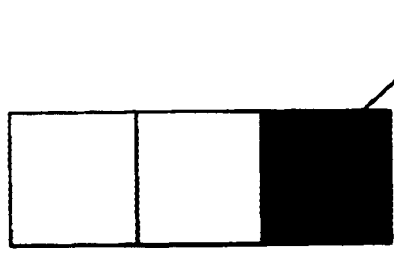
FIG. 4 is a diagram illustrating one exemplary condition to qualify a pixel as a start edge point.
Figure 5:
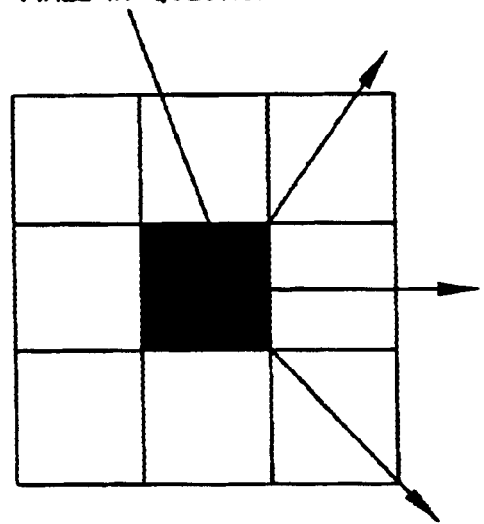
FIG. 5 is a diagram illustrating other exemplary conditions to qualify a pixel as a start point.

Now referring to FIG. 4, an exemplary start edge point is illustrated in a diagram. To qualify as a start point, a pixel in question must have in the vicinity a character edge which is determined based upon predetermined criteria used in prior art disclosures such as Hei 10-108012. In this example, with respect to the pixel in question, the left side is in a light color equivalent to a background color while the right side is substantially darker. It is also required that the right side lacks a "screen dots." The left side continuous light color area is sought in a wider area. FIG. 5 illustrates other conditions for the exemplary start point. With respect to intensity of the pixel in question, that of eight surrounding pixels is compared. If the predetermined contrast or difference in intensity is additionally found in one of the three directions on the right hand side as shown in FIG. 5, the pixel in question is determined to be a start edge point. Although the above example considered only eight surrounding pixels, the number or the distance of the surrounding pixels is not limited. In addition, in stead of intensity in light, a color space such as Lab or G of the RGB signal is used to determine the continuity in the left side as well as the contrast in the right side. One exemplary way to determine an end edge point is to mirror image the left and right sides of FIGS. 4 and 5 and to apply the above described criteria.

Figure 6:
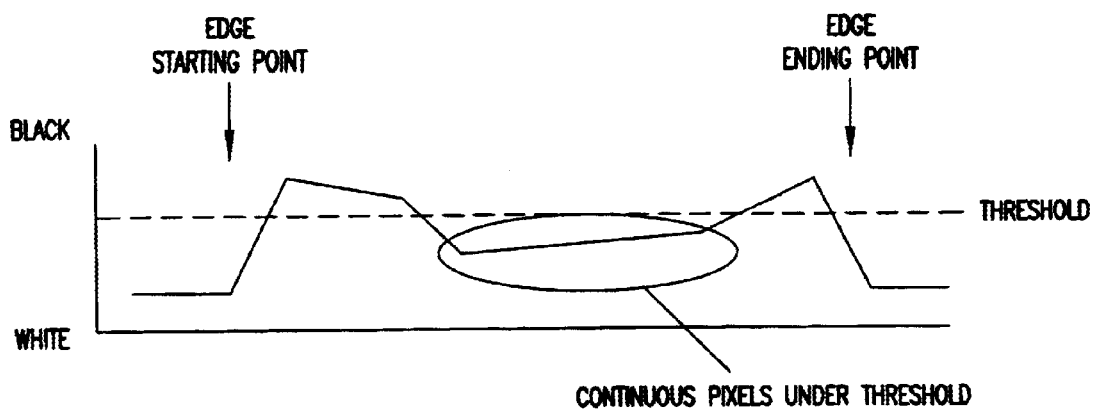
FIG. 6 is an exemplary graph of the stored image characteristic values used by a preferred process of the character edge determination according to the current invention.
Figure 7:
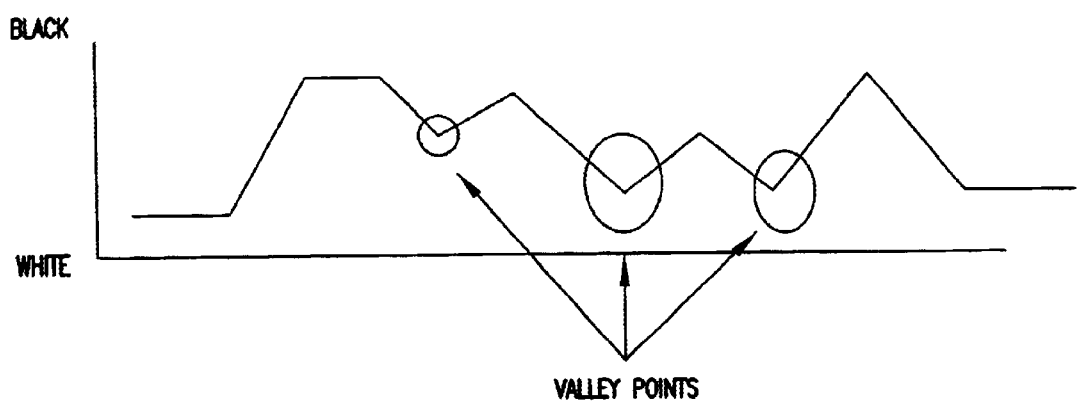
FIG. 7 is a second exemplary graph of the stored image characteristic values used by a preferred process of the character edge determination according to the current invention.
Figure 8:
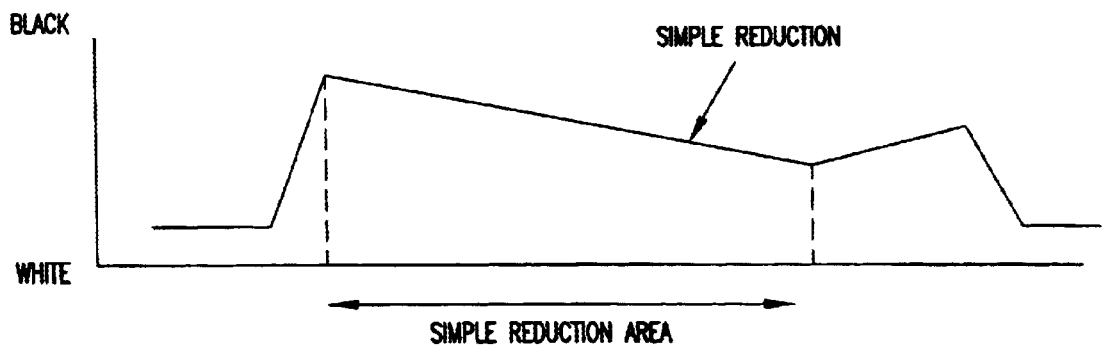
FIG. 8 is a third exemplary graph of the stored image characteristic values used by a preferred process of the character edge determination according to the current invention.

Now referring to FIGS. 6 through 8, diagrams illustrate the processes to be performed on the inner area or a middle portion of a characters that is defined by the start edge point and the end edge point. In general, the character middle part determination unit 404 processes the middle portion as an edge pair unit based upon the image characteristic stored in the characteristic counter unit 405 as shown in FIG. 2. In other words, the character edge is determined as a whole based upon an edge pair including start and end points and a middle portion between the edge pair. Referring specifically to FIG. 6, the stored image characteristic values are processed by a preferred process of the character edge determination according to the current invention. The number of pixels between the start edge point and the end edge point is designated as D, and among the D pixels, the maximal number of continuous pixel values that is below a predetermined threshold value is N1. If N1>th1 or N1>D·th2 where th1 and th2 are predetermined thresholds, then the edge pair is not considered to be a part of a character.

Specifically to FIG. 7, the stored image characteristic values are processed by a second preferred process of the character edge determination according to the current invention. In general, a valley point is defined to be a point where the value of a pixel in question is lower than that of a preceding pixel and that of a proceeding pixel by a predetermined value. More specifically, the valley point is found when $P_i-P_{i-1}>Th3$ and $P_{i+1}-P_i>Th3$ where $P_i$ is a pixel in question, $P_{i-1}$ is a preceding pixel, $P_{i+1}$ is a proceeding pixel and Th3 is a predetermined threshold value. The second preferred process generates a histogram of pixel values based upon the stored image characteristic values and determines whether or not the current edge pair is a character based upon the distribution of the above defined valley points. Alternatively, the difference between the highest peak value and the lowest peak value is compared to a predetermined threshold to determine whether or not the current edge pair is a character.

Now referring to FIG. 8, the stored image characteristic values are processed by a third preferred process of the character edge determination according to the current invention. In general, the number of continuously increasing or decreasing pixels or simple increase or decrease is used as an image characteristic index to determine whether or not the current edge pair is a character. The maximal number of the continuously increasing pixel values is designated as MaxInc while the maximal number of the continuously decreasing pixel values is designated as MaxDec. Using the above defined image characteristic indexes, if MaxInc>D·th4 or MaxDec>D·th5 where D is a number of pixels within a given edge pair and th4 and th5 are respectively predetermined threshold values, then the edge pair is determined to be non character.

Figure 9:
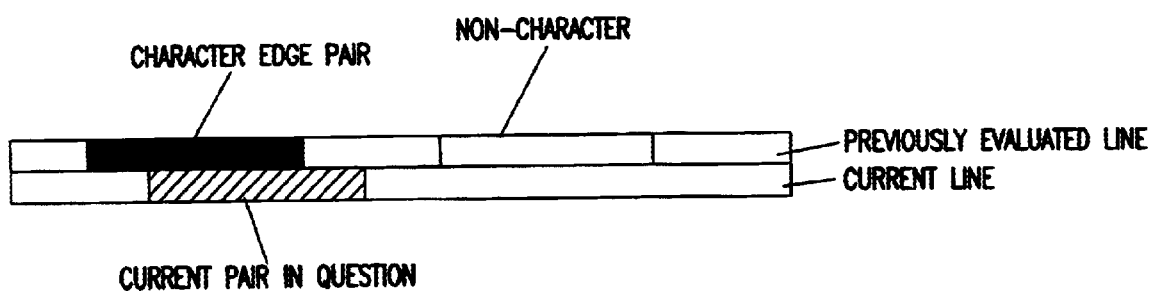
FIG. 9 is a diagram illustrating the use of a previously processed line for the determination of the current pixel in question as a character edge pair.

In another preferred process of the character edge determination according to the current invention, a set of three counters is used to determine whether or not the current edge pair is a character. The first counter is designated as N1 for keeping track of the number of screen dots with respect to a pixel in question. The second counter is designated as N2 for keeping track of the number of "white" or light background with respect to a pixel in question. Lastly, the third coutner N3 keeps track of the status of the previously processed line such a line above the currently processed pixel in question. In other words, the third counter N3 is incremented by one when a corresponding portion of the above line is determined to include a character edge pair as shown in FIG. 9. Base upon the above described counters, if N1<D·th1 and N2<D·th2 and N3>D·th3 where D is the number of pixels within a given edge pair and th1–3 are a predetermined value, then the given edge pair is determined to be a part of a character. Alternatively, absolute values of the counters may be used without the predetermined values.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of detecting character edges, comprising:
   inputting image data;
   detecting a first edge point in the image data;
   detecting a second edge point which corresponds to the first edge point, the first edge point and the second edge point defining an edge pair;
   detecting a change in pixel value within the edge pair; and
   determining whether or not the edge pair as a unit is a character portion based upon the change in the pixel value between the edge pair with respect to a predetermined set of conditions for defining the character portions, the predetermined set of the conditions including a threshold value, the edge pair being determined as the character portion when the change in the pixel value is absent below the threshold value in a predetermined continuous number of the pixel values.

2. The method of detecting character edges according to claim 1 wherein the edge pair is determined as the character portion when the change in the pixel value lacks a predetermined maximal number of monotonously changing pixel values within the edge pair.

3. The method of detecting character edges according to claim 1 wherein the edge pair is determined as the character portion when the change in the pixel value lacks a predetermined distribution pattern of valley points within the edge pair.

4. The method of detecting character edges according to claim 1 wherein said detecting of the first edge point and said detecting of the second edge point are performed along horizontal lines in the image data.

5. The method of detecting character edges according to claim 4 wherein the edge pair is determined as the character portion additionally based upon a result on said determining step of adjacently located one of the horizontal lines.

6. The method of detecting character edges according to claim 1 wherein the conditions include the pixel values near the edge pair.

7. The method of detecting character edges according to claim 1 wherein the image data is multiple bit data.

8. The method of detecting character edges according to claim 1 wherein the edge pair being determined as the character portion when the change in the pixel value stays above the threshold value within the edge pair.

9. The method of detecting character edges according to claim 1 wherein the edge pair is further determined as the character portion based upon absence of a screen dot between the edge pair.

10. A system for detecting character edges, comprising:
    an image input unit for inputting image data;
    an edge detection unit connected to said image unit for detecting a first edge point in the image data, said edge detection unit also detecting a second edge point which corresponds to the first edge point, the first edge point and the second edge point defining an edge pair; and an edge pair evaluation unit connected to said edge detection unit for detecting a change in pixel value within the edge pair, said edge pair evaluation unit determining whether or not the edge pair as a unit is a character portion based upon the change in the pixel value between the edge pair with respect to a predetermined set of conditions for defining the character portions, the predetermined set of the conditions including a threshold value, the edge pair being determined as the character portion when said edge pair evaluation unit determines that the change in the pixel value is absent below the threshold value in a predetermined continuous number of the pixel values.

11. The system for detecting character edges according to claim 10 wherein the edge pair is determined as the character portion when said edge pair evaluation unit determines that the change in the pixel value lacks a predetermined maximal number of monotonously changing pixel values within the edge pair.

12. The system for detecting character edges according to claim 10 wherein the edge pair is determined as the character portion when the change in the pixel value lacks a predetermined distribution pattern of valley points within the edge pair.

13. The system for detecting character edges according to claim 10 wherein said edge detection unit detects the first edge point and the second edge point along horizontal lines in the image data.

14. The system for detecting character edges according to claim 13 wherein said edge pair evaluation unit determines that the edge pair is the character portion additionally based upon a result on adjacently located one of the horizontal lines.

15. The system for detecting character edges according to claim 10 wherein the conditions include the pixel values near the edge pair.

16. The system for detecting character edges according to claim 10 wherein the image data is multiple bit data.

17. The system for detecting character edges according to claim 10 wherein the edge pair being determined as the character portion when said edge pair evaluation unit determines that the change in the pixel value stays above the threshold value within the edge pair.

18. The system for detecting character edges according to claim 10 wherein the edge pair being determined as the character portion when said edge pair evaluation unit further determines absence of a screen dot between the edge pair.

19. A method of separating a character area from digitized image data, comprising the steps of:

inputting the digitized image data;

detecting a first edge point in the digitized image data;

detecting a second edge point which corresponds to the first edge point, the first edge point and the second edge point defining an edge pair;

detecting a screen dot between the edge pair;

detecting a change in pixel values between the edge pair with respect to a predetermined threshold value; and determining whether or not the edge pair as a unit defines the character area based upon the change in the pixel values and absence of the screen dot between the edge pair wherein the screen dot is detected when the change in the pixel values stays above the threshold value within the edge pair and is absent below the threshold value in a predetermined continuous number of the pixel values.

20. The method of separating a character area from digitized image data according to claim 19 wherein the edge pair is determined as the character area when the change in the pixel values lacks a predetermined maximal number of continuously changing pixel values within the edge pair.

21. The method of separating a character area from digitized image data according to claim 19 wherein the edge pair is determined as the character area when the change in the pixel values lacks a predetermined distribution pattern of valley points within the edge pair.

22. The method of separating a character area from digitized image data according to claim 19 wherein said detecting of the first edge point and said detecting of the second edge point are performed along horizontal lines in the digitized image data.

23. The method of separating a character area from digitized image data according to claim 22 wherein the edge pair is determined as the character area additionally based upon a result on said determining step of adjacently located one of the horizontal lines.

24. A device for separating a character area from digitized image data, comprising:

an image input unit for inputting the digitized image data;

an edge detection unit connected to said image unit for detecting a first edge point in the digitized image data, said edge detection unit also detecting a second edge point which corresponds to the first edge point, the first edge point and the second edge point defining an edge pair; and an edge pair evaluation unit connected to said edge detection unit for detecting a screen dot and a change in pixel values within the edge pair, said edge pair evaluation unit determining whether or not the edge pair as a unit is a character area based upon absence of the screen dot and the change in the pixel values between the edge pair with respect to a predetermined threshold value wherein the edge pair is determined as the character area when said edge pair evaluation unit determines that the change in the pixel values stays above the threshold value within the edge pair and is absent below the threshold value in a predetermined continuous number of the pixel values.

25. The system for separating a character area from digitized image data according to claim 24 wherein the edge pair is determined as the character area when said edge pair evaluation unit determines that the change in the pixel values lacks a predetermined maximal number of continuously changing pixel values within the edge pair.

26. The system for separating a character area from digitized image data according to claim 24 wherein the edge pair is determined as the character area when the change in the pixel value lacks a predetermined distribution pattern of valley points within the edge pair.

27. The system for separating a character area from digitized image data according to claim 24 wherein said edge detection unit detects the first edge point and the second edge point along horizontal lines in the digitized image data.

28. The system for separating a character area from digitized image data according to claim 27 wherein said edge pair evaluation unit determines that the edge pair is the character area additionally based upon a result on adjacently located one of the horizontal lines.

* * * * *